US007765955B2

(12) United States Patent
Brooks et al.

(10) Patent No.: US 7,765,955 B2
(45) Date of Patent: Aug. 3, 2010

(54) PET DOOR

(75) Inventors: Steve Brooks, Pyrford (GB); Robert Wiedemann, Middlesex (GB); David A. Woodfield, Walsall (GB)

(73) Assignee: Pet Mate Ltd., Hersham, Surrey (GB)

( * ) Notice: Subject to any disclaimer, the term of this patent is extended or adjusted under 35 U.S.C. 154(b) by 310 days.

(21) Appl. No.: 11/551,634

(22) Filed: Oct. 20, 2006

(65) Prior Publication Data

US 2007/0089684 A1 Apr. 26, 2007

(30) Foreign Application Priority Data

Oct. 22, 2005 (GB) ................................ 0521553.8

(51) Int. Cl.
*A01K 1/03* (2006.01)
*E05F 11/00* (2006.01)
*H01H 9/00* (2006.01)

(52) U.S. Cl. ....................... 119/484; 119/501; 119/165; 49/360; 49/169; 49/25; 160/188; 160/1; 160/9; 335/205

(58) Field of Classification Search ................. 119/484, 119/501, 165; 49/360, 169, 25
See application file for complete search history.

(56) References Cited

U.S. PATENT DOCUMENTS 4,148,001 A * 4/1979 Gwozdz ..................... 335/205
4,365,250 A * 12/1982 Matsuoka et al. .......... 340/5.71
4,421,058 A * 12/1983 Paul ........................... 119/484
4,497,133 A * 2/1985 Blenkinsop .................... 49/31
4,990,898 A * 2/1991 Greene .................. 340/693.11
5,056,467 A * 10/1991 Schaefer ..................... 119/666
5,992,096 A * 11/1999 De La Cerda et al. ......... 49/169
6,141,911 A * 11/2000 Reid .......................... 49/394
6,609,738 B1 * 8/2003 Roth et al. ............... 292/251.5
2002/0011217 A1 * 1/2002 Brooks ....................... 119/481
2005/0252622 A1 * 11/2005 Reid .......................... 160/180
2007/0175097 A1 * 8/2007 Thorne et al. ................. 49/169

* cited by examiner

*Primary Examiner*—Andrea M Valenti
(74) *Attorney, Agent, or Firm*—Egbert Law Offices PLLC

(57) ABSTRACT

A pet door unit allowing entry to and egress from a dwelling of an animal includes a pet door provided with a latch. The pet door is mounted for movement to allow passage of an animal when the latch is disabled. The pet door unit includes an animal detector for detecting an animal seeking passage past the pet door. A controller allows selection of a permitted passage condition. A disabler selectively disables the latch. Other arrangements described include systems for controlling entry and exit for different animals in different time frames, systems that detect an animal by a tag carried by the animal, systems that detect a door, systems that detect whether an animal has actually passed through the door and in which direction, and systems that record time and direction of passage, a preferred coil geometry for tag detection, and a preferred latch.

5 Claims, 6 Drawing Sheets

PET DOOR

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

This invention relates to doors for pets, for example a door to allow the pets egress from or entry into a dwelling.

2. Description of Related Art Including Information Disclosed Under 37 CFR 1.97 and 37 CFR 1.98

Pet doors of various kinds for cats and dogs are widely available. The doors for cats are usually called "cat flaps".

Pet doors are adapted to be fitted in a lower portion of a wall or of an existing full-sized door. The pet door may consist simply of a flap, often being transparent so that the animal can see where it is going, and being hung from a horizontal axis to swing against the force of gravity when pushed by an animal. Alternative structures are mounted to swing about a vertical axis, but since they do not have gravity to bring the door/flap back to a closed position, they require springs to bias the door/flap to its neutral closed position. Also available are flexible transparent flaps, where the top of the flexible flap is held in fixed position and the animal bends the flap to make an entry or exit.

A simple latch may be provided for holding the door/flap at its neutral closed position so as to prevent movement of the door/flap in either direction or in just one direction. In the latter case, the latch may be arranged so as to allow entry but not egress or alternatively to allow egress but not entry.

The problem with such simple constructions is that, depending upon the position of the latch, any animal of the size to fit through the opening may gain entry or egress. In order to prevent passage of unwanted stray animals, pet doors have been designed with magnetically operable latches. The latch, powered by battery, is operable only when a magnetic tag (or in other operations an electrical loop) is detected. In simple mechanisms, any magnetic tag of adequate field strength will unlock the latch.

More sophisticated constructions have been designed in an attempt to allow selective operation of a door by a selected animal with the appropriate tag.

Pets commonly carry a subdermal identification coded tag. GB2376977 of Duerden, suggests transmitting a radio frequency signal at intervals to cause a signal to be transmitted by the standard passive coded subdermal identification tag carried by an animal, detection by a pet door of the retransmitted signal being adapted to open a pet door latch if the identification tag matches a code in memory. It is doubtful whether the Patentee had given any serious thought as to how the system could be put into effect. This prior proposal gives no detail as to how to effectively couple a transmitter or receiver at the pet door to a passive subdermal tag so as to get any useful received signal or how to discriminate between the millions of such tags in existence. In practice such subdermal tags can only be "read" by an interrogation coil placed on the skin immediately above the subdermal tag. If the tag has moved, in general it cannot be located. The poor coupling between an aerial associated with a pet door and the conventional subdermal tag, as well as the high energy requirements for a system based on utilizing such tags to control a pet door, makes a system of the kind proposed in GB2376977 unworkable.

GB1187383 of National Research Development Corporation is concerned with a somewhat different use, namely controlling access to different feeding spaces in a cow byre for different cows, in which each cow has a tag with a characteristic frequency effective to allow access only to its dedicated feeding space.

BRIEF SUMMARY OF THE INVENTION

In contrast to the prior art and in accordance with a first aspect of this disclosure, a pet door unit is adapted to allow entry to and egress from a dwelling of an animal. The pet door unit includes a pet door provided with a latch means, the pet door being mounted for movement to allow passage of the animal therepast when the latch means is disabled. The pet door unit is adapted to be fitted in one of: a lower portion of an existing door or window to allow entry or egress via the pet door when the existing door or window is closed, and a lower portion of a wall.

The pet door unit comprises:

- an animal detector for detecting an animal apparently seeking passage past the pet door;
- a controller allowing selection of a permitted passage condition via the pet door, the permitted passage condition being selected from entry to the dwelling but not egress, egress from the dwelling but not entry, both entry to and egress from the dwelling, and neither entry to nor egress from the dwelling; and
- a selective latch disabler for selectively disabling said latch means to allow passage past the pet door; the disabler being coupled to the controller to disable the latch means in accordance with the selected permitted passage condition when the animal detecting means detects an animal seeking entry or seeking egress.

The term "latch means" as used herein is to be understood to mean any arrangement for latching a pet door. This may be a single latch or separate latches for respectively preventing entry and egress.

In a second and alternative aspect, a pet door unit is adapted to control entry to and egress from a dwelling of an animal, the pet door unit including a pet door provided with latch means, the pet door being mounted for movement to allow passage of the animal therepast when the latch means is disabled. The pet door unit is adapted to be fitted in one of: a lower portion of an existing door or window to allow controlled entry or egress via the pet door when the existing door or window is closed, and a lower portion of a wall.

The pet door unit further comprises:

- a clock;
- a controller coupled to the clock and including a selector for selecting a permitted entry period in which the animal is allowed entry to the dwelling, and a permitted exit period in which the animal is permitted egress from the dwelling;

an animal detector coupled to the controller for detecting whether an animal appears to be seeking entry or egress via the pet door; and a selective latch disabler for selectively disabling said latch means to allow passage past the pet door, the disabler being coupled to the controller to disable the latch means to allow entry when the animal detector detects an animal seeking entry during said permitted entry period, and also to disable the latch means to allow egress when the detecting means detects an animal seeking egress during said permitted exit period.

In a third alternative aspect, a pet door unit is adapted to control entry to and egress from a dwelling of a plurality of animals, each animal being provided with a detectable tag identifying the particular animal, the pet door unit including a pet door provided with latch means, the pet door being mounted for movement to allow passage of the animal therepast when the latch means is disabled. The pet door unit is adapted to be fitted in one of: a lower portion of an existing door or window to allow controlled entry or egress via the pet door when the existing door or window is closed, and a lower portion of a wall.

The pet door unit comprises:

a clock;

a controller coupled to the clock and including a selector for selecting, for each said tag, a permitted entry period in which the animal associated with that tag is allowed entry to the dwelling, and a permitted exit period in which the animal associated with that tag is permitted egress from the dwelling;

an animal detector coupled to the controller for detecting whether an animal appears to be seeking entry or egress via the pet door;

a tag detector adapted to detect the presence of a said tag in a region adjacent the pet door; and a selective latch disabler for selectively disable said latch means to allow passage therepast, the disabler being coupled to the controller to disable the latch means to allow entry at a time when both the tag detector detects a tag and the animal detector detects an animal seeking entry during said permitted entry period for that tag, and also to disable the latch means to allow egress when both the tag detector detects a tag and the animal detector detects an animal seeking egress during said permitted exit period for that tag.

The tag may be detected by infra-red detection, magnetic detection, or inductive loop detection.

The animal detector may comprise two reed switches, each having a closed state and an open state, operable by a magnet carried by the pet door. The pet door has a central median position, the pet door, when latched, being movable through a first minor distance from the central median position in a direction into the dwelling by an animal pushing the pet door from outside in that direction. The arrangement of reed switches and magnet is such that the open or closed state of a first of the two reed switches is changed by movement of the pet door through the said first minor distance. The pet door, when latched, is movable through a second minor distance from the central median position in a direction out of the dwelling by an animal pushing the pet door from inside in that direction. The arrangement of reed switches and magnet is such that the open or closed state of the second of the two reed switches is changed by movement of the door through the second minor distance.

In a fourth alternative aspect, a pet door unit is adapted to control entry to and egress from a dwelling of a plurality of permitted animals, each animal being provided with a detectable tag, the tags being the same or different. The pet door unit includes a pet door provided with latch means, the pet door being mounted for movement to allow passage of the animal therepast when the latch means is disabled. The pet door unit is adapted to be fitted in one of: a lower portion of an existing door or window to allow controlled entry or egress via the pet door when the existing door or window is closed, and a lower portion of a wall.

The pet door unit comprises:

a tag detector operatively adapted to detect the presence in a region adjacent the pet door of a tag identifying a permitted animal; and a latch disabler for disabling said latch means for the pet door to allow permitted passage therepast to an animal bearing a tag so detected, said disabler being operable within a selected period of permitted passage associated with the said tag, the period of disablement of the latch means before it is enabled again allowing passage of the animal bearing the detected tag past the pet door.

The pet door unit has a power saving mode in which the tag detector and the latch disabler remain inactive and the door remains latched, and an active mode in which the tag detector is operable and in which the latch disabler is also operable if a tag associated with a permitted animal is detected by the tag detector during a period of permitted passage associated with the tag.

The pet door unit further comprises an animal detector separate from the tag detector for detecting whether an animal appears to be seeking passage via the pet door, the animal detector being adapted to initiate the active mode when an animal's presence is detected and the pet door unit is in power saving mode.

In this case, the animal detector may comprise one or more reed switches, each reed switch having a closed state and an open state and being operable by a magnet carried by the pet door. The pet door has a central median position. The pet door, when latched, is movable through a first minor distance from the central median position in a direction into the dwelling by an animal pushing the pet door from outside in that direction. The arrangement of the one or more reed switches and the magnet is such that the open or closed state of the or a first of the reed switch(es) is changed by movement of the pet door through the first minor distance. The pet door, when latched, is movable through a second minor distance from the central median position in a direction out of the dwelling by an animal pushing the pet door from inside in that direction. The arrangement of the one or more reed switches and the magnet is such that the open or closed state of the or a second of the reed switch(es) is changed by movement of the pet door through the first minor distance.

In all the above units, where two reed switches are employed, preferably the two reed switches are mounted alongside each other in proximity to an edge of the pet door. Each reed switch is generally tubular in configuration to define a longitudinal direction, and one reed switch is displaced relative to the other in its longitudinal direction into the dwelling, while the other reed switch is displaced relative to the one in its longitudinal direction out of the dwelling. The magnet comprises a magnet mounted in said edge so that in the central median position of the pet door the magnet is effective to close both reed switches, movement of the pet door through the first minor distance by being pushed from outside being effective to move the magnet to a position in which it opens said one reed switch. Movement of the pet door through the second minor distance by being pushed from inside is effective to move the magnet to a position in which it opens the other reed switch.

Opening detection means may be provided to detect whether the pet door has been opened subsequent to the latch means being disabled. Means are preferably provided to delay at least one of initiation of the active mode and operation of the animal detector when, on a predetermined number n of occasions within a set period, an animal has been detected by the animal detector as apparently seeking passage via the pet door without subsequent opening of the pet door being detected by the opening detection means. As explained in the detailed description hereinbelow, this feature helps to preserve battery power with a diffident cat or in windy conditions where false indications that an animal is present at the pet door might occur.

According to a fifth alternative aspect, a pet door unit is adapted to control entry to and egress from a dwelling for at least one animal, the pet door unit including a pet door provided with latch means. The pet door is mounted for movement to allow passage of the animal therepast when the latch means is disabled, the pet door having a central median position in which it is latched. The pet door unit is adapted to be fitted in one of: a lower portion of an existing door or window to allow controlled passage via the pet door when the existing door or window is closed, and a lower portion of a wall.

The pet door unit further comprises:

a latch disabler for disabling said latch means to allow passage of an animal; and a latch enabler for enabling the latch means to re-latch the pet door after an animal has passed therepast and the pet door has returned to its central median position, and including a door position detector for detecting whether the door is located in its central median position.

The disabler may be controllable to allow passage for the animal in a selected entry or egress direction.

The door position detector preferably comprises one or more reed switches, each reed switch having a closed state and an open state and being operable by magnet means carried by the pet door. The arrangement of the one or more reed switches and the magnet is such that the open or closed state of a first of the reed switch(es) is changed by movement of the pet door from the central median position into the dwelling. The arrangement of the one or more reed switches and the magnet is such that the open or closed state of a second of the reed switch(es) is also changed by movement of the pet door from the central median position out of the dwelling.

Preferably there are two reed switches, namely said first reed switch and said second reed switch. The two reed switches are mounted alongside each other in proximity to an edge of the pet door, each reed switch being generally tubular in configuration to define a longitudinal direction, and one reed switch being displaced relative to the other in its longitudinal direction into the dwelling, while the other reed switch is displaced relative to the one in its longitudinal direction out of the dwelling. The magnet comprises a magnet mounted in said edge so that in the central median position of the pet door the magnet is effective to close both reed switches. Movement of the pet door from the central median position into the dwelling is effective to move the magnet to a position in which it opens said one reed switch, and movement of the pet door from the central median position out of the dwelling being effective to move the magnet to a position in which it opens said other reed switch.

In a sixth alternative aspect, a pet door unit is adapted to control entry to and egress from a dwelling for an animal, the pet door unit including a pet door that is mounted for movement to allow passage of the animal therepast. The pet door has a central median position. The pet door unit is adapted to be fitted in one of: a lower portion of an existing door or window to allow entry or egress via the pet door when the existing door or window is closed, and a lower portion of a wall.

The pet door unit further comprises:

an electrically operable determinator for determining in which direction the animal last passed the pet door and adapted to provide an indication whether the animal is likely to be within the dwelling or outside, the determinator including an opening detector adapted to detect that the door has been opened by at least a predetermined amount indicative of an animal having passed the pet door.

Preferably, the electrically operable determinator comprises: a direction of movement detector for determining, when the pet door leaves its central median position, in which direction it moves; and an extent of movement detector comprising a reed switch having a closed state and an open state and being operable by magnet means carried by the pet door; the arrangement of the reed switch and the magnet being such that the open or closed state of the reed switch is changed by a movement of the pet door from the central median position in either direction sufficiently for the animal to have passed therepast.

A clock may also be provided, together with means for recording the time of last passage of an animal past the pet door.

In a seventh alternative aspect, a pet door unit is adapted to control entry to and egress from a dwelling for a plurality of animals, each provided with a detectable tag with a different identity. The pet door unit includes a pet door that is mounted for movement to allow passage of the animal therepast, the pet door having a central median position. The pet door unit is adapted to be fitted in one of: a lower portion of an existing door or window to allow controlled entry or egress via the pet door when the existing door or window is closed, and a lower portion of a wall.

The pet door unit further comprises:

a tag detector adapted to detect the identity of a tag in a region adjacent the pet door;

an animal passage determinator for determining that an animal has passed the pet door and in which direction; and a store coupled to said determinator for storing, for a particular passage via the pet door, the direction detected by the determinator and the identity of the tag as detected by said tag detector.

That an animal has passed the door and in which direction can be detected in various ways, including infra-red detectors mounted on either side of the door. However, the determinator preferably comprises: a direction of movement detector for determining, when the pet door leaves its central median position, in which direction it moves; and an extent of movement detector comprising a reed switch having a closed state and an open state and being operable by a magnet carried by the pet door. The arrangement of the reed switch and the magnet is such that the open or closed state of the reed switch is changed by a movement of the pet door from the central median position in either direction sufficiently for the animal to have passed therepast.

The pet door may further comprise a clock, and a recorder coupled to the clock for recording for each of said tags both the time and direction of last passage of the animal associated with that tag past the pet door.

In a preferred arrangement, the pet door is mounted for rotation on a pivot about a horizontal or vertical axis, and said extent of movement detector comprises a magnet located on the door at one axial end of the pivot to rotate therewith. The reed switch is mounted in a fixed position in confronting relation to the magnet.

The direction of movement detector may comprise one or more reed switches, each reed switch having a closed state and an open state and being operable by a co-operating magnet carried by the pet door. The arrangement of the one or more reed switches and the magnet is such that the open or closed state of one of the reed switch(es) is changed by one of movement of the pet door from the central median position into the dwelling and movement of the pet door from the central median position out of the dwelling.

In a preferred arrangement, the direction of movement detector comprises two reed switches mounted alongside each other in proximity to an edge of the pet door, each of said two reed switches being generally tubular in configuration to define a longitudinal direction. One reed switch is displaced relative to the other in its longitudinal direction into the dwelling, while the other reed switch is displaced relative to the one in its longitudinal direction out of the dwelling. The co-operating magnet comprises a magnet mounted in said edge so that in the central median position of the pet door the magnet is effective to close both reed switches, movement of the pet door from the central median position into the dwelling being effective to move the magnet to a position in which it opens said one reed switch. Movement of the pet door from the central median position out of the dwelling is effective to move the magnet to a position in which it opens said other reed switch.

In all the above arrangements in different aspects, where a pair of reed switches are employed, the two reed switches are preferably connected in series across a source of electric potential by a first reed of a first one of said two reed switches being connected to a first reed of the second one of said two reed switches in a circuit providing first and second inputs on first and second lines. The first line is connected to a second reed of said first one of the two reed switches, and the second line is connected both to the first reed of said first one of the two reed switches and to the first reed of the second one of said two reed switches. Detection of the potential of the second reed of the second one of the two reed switches on the first line indicates that both reed switches are closed and the pet door is in its median central position. Detection of the potential of the second reed of the first one of the two reed switches on the first line and the potential of one of the second reeds of the two reed switches on the second line indicates that the pet door has moved, the direction being determined by which of the two potentials is present on the second line. Detection of the potential of the second reed of the first one of the two reed switches on the first line and a potential other than those of the two second reeds on the second line indicates that the pet door is open.

In an eighth alternative aspect, a method of recording movement of an animal past a pet door to determine whether the animal is within or outside a dwelling provided with the pet door and the time interval since the animal last passed through the pet door comprises the steps of:

- providing the animal with an interrogatable passive tag;
- transmitting an interrogation signal receivable by a said tag in a vicinity close to the pet door, said transmitting step being triggered by an animal seeking passage through the pet door;
- determining from which side of the door the animal was seeking passage;
- determining from said interrogation signal whether the tag has been identified, and, if so, disabling the latch for a period sufficient for the animal to make passage past the pet door; and
- determining whether the pet door has in fact opened sufficiently for passage of the animal during the period in which the latch was disabled, and if so, recording the time and direction of such passage.

Although the embodiment of pet door unit described in detail hereinbelow is adapted for electrical detection of tags worn by permitted animals, other arrangements are possible. For the purpose of some aspects of this disclosure, it is not necessary that animals wear any tag at all. In some cases, detection of the presence of an animal or a permitted animal may be by infrared, by magnetic coupling or, as in the arrangement described in detail below by decoding the modulation of an interrogation signal caused by coded tags worn by the animals. Each tag may then comprise a coil to couple with a coil of the pet door unit, a capacitor and a binary coded microchip. In electrical systems, coupling to a passive tag worn by an animal is inductive, and improved coupling will achieve better results.

In an eighth alternative aspect, a pet door unit is adapted to control entry to and egress from a dwelling of a plurality of permitted animals, each animal being provided with a tag detectable by inductive coupling with a coil mounted on the pet door unit, the tags being the same or different. The pet door unit includes a pet door provided with latch means, the pet door being mounted for movement to allow passage of the animal therepast when the latch means is disabled. The pet door unit is adapted to be fitted in one of: a lower portion of an existing door or window to allow controlled entry or egress via the pet door when the existing door or window is closed, and a lower portion of a wall.

The pet door unit further comprises:

- a tag detector, including said coil, operatively adapted to detect the presence in a region adjacent the pet door of a said tag identifying a permitted animal; and
- a latch disabler for disabling the latch means to allow permitted passage past the pet door to an animal bearing a tag so detected, said disabler being operable within a selected period of permitted passage associated with the said tag, the period of disablement of the latch means before it is enabled again allowing passage of the animal bearing the detected tag past the pet door.

The coil circumextends about the perimeter of the pet door and is diverted from the periphery of the pet door below the pet door to a position adjacent the lower edge of the pet unit to enhance coupling with a tag attached to the collar of an animal and hanging beneath its neck.

The latch mechanism of the detailed embodiment of pet door unit described in detail with reference to the accompanying drawings is believed novel in itself. Accordingly, in a ninth alternative aspect, a pet door unit is adapted to control entry to and egress from a dwelling of one or more permitted animals. The pet door unit includes a latchable pet door that is mounted for movement to allow passage of an animal therepast when its latch is disabled. The pet door unit is adapted to be fitted in one of: a lower portion of an existing door or window to allow controlled entry or egress via the pet door when the existing door or window is closed, and a lower portion of a wall. The latch comprises a latch member constrained to move in a generally vertical direction into and out of engagement with the pet door to latch it and unlatch it, and being provided with drive means therefor, comprising an electric motor and a rotatable drive rod coupled to the said motor. The drive rod is coupled to turn a wheel provided with an eccentrically mounted pin, the latch member including an elongate through slot, the longitudinal direction of the slot being generally horizontal. The pin is constrained to slide in said slot, whereby rotation of the drive rod by the motor is effective to rotate the wheel so that its pin slides in the horizontal slot, causing the latch member to be raised or lowered depending on the direction of rotation of the motor.

The drive rod may be coupled to turn a second wheel mounting an opaque sector plate adapted to occlude a light sensor to provide an indication of the position of the latch. One or both of the wheels may be coupled to the drive rod via a worm drive.

BRIEF DESCRIPTION OF THE SEVERAL VIEWS OF THE DRAWINGS

An embodiment is hereinafter more particularly described, by way of example only, with reference to the accompanying drawings.

DETAILED DESCRIPTION OF THE INVENTION

Pet doors are commonly sold as a unit to be fitted through a lower portion of an existing door intended for human use, so as to allow entry and egress for pets via the pet door when the existing door is closed.

Figure 1:
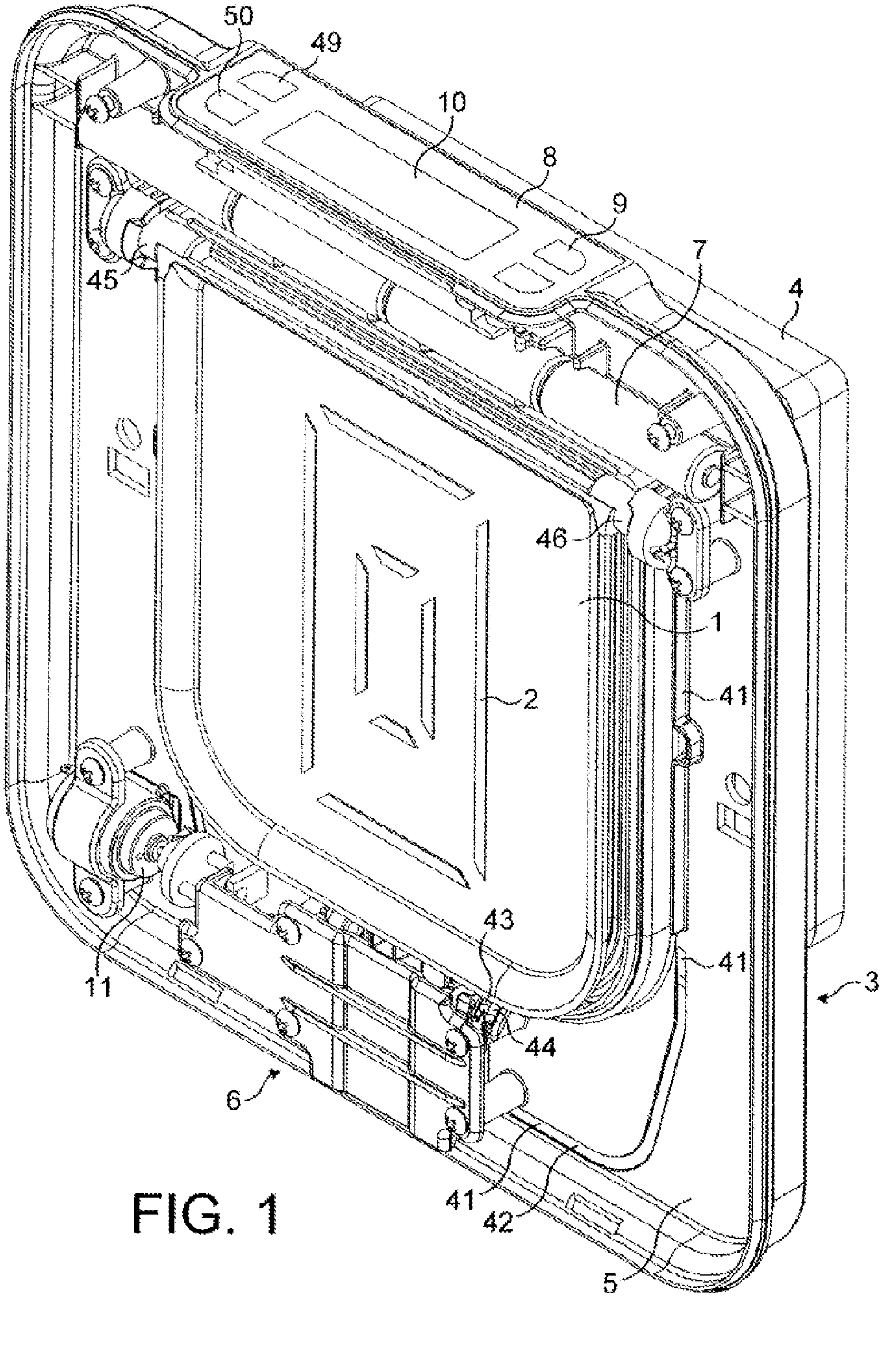
FIG. 1 is an overall perspective view of a pet door unit with a housing cover omitted to show internal parts, and with other parts omitted for clarity.

FIG. 1 is an overall perspective view of an embodiment of a pet door unit comprising a pet door proper (here a vertically mounted flap adapted to turn on a horizontal axis), associated housing, latch and control mechanisms. Flap 1 is mounted in a housing 3, suitably moulded of plastics, which includes a generally tubular section or tunnel 4, here of generally square cross-section, which is adapted to pass through a correspondingly shaped, but slightly larger, opening formed through the lower portion of an existing door or window to allow mounting of the pet door therein. Main portion 5 of the housing fits flush against and is fixed to the inner side of the existing door, which may be of any conventional construction, including glass, pvc, metal and wood, or window. There may be a further face plate or housing portion (not shown) that fits over the tunnel 4 and flush against the outer side of the existing door or window to provide a neat appearance. It will be understood that main portion 5 is fitted with a cover (omitted to allow the mechanism to be seen) which has a central opening therein corresponding to the shape of and slightly larger than the flap 1.

It will be appreciated that, provided the tunnel is long enough or a bespoke tunnel is formed, the pet door unit may, alternatively, be fitted through a wall rather than an existing door. However, for the purpose of this description, it is assumed that the unit is fitted to an existing door.

The pet door unit is provided with a latch mechanism 6, generally indicated and operated by battery power from a stack of batteries 7 under control of a processor 8, which may have one or more indicators or buttons 9 and/or an LCD screen 10 adapted to present instructions and/or information in alpha-numeric form.

As explained in detail below, the latch mechanism in this case comprises a single latch plate that operates to latch the door against opening in either direction. In alternative arrangements, there may be an individual latch on either side of the door, one serving to prevent entry, and the other serving to prevent egress.

Figure 2:
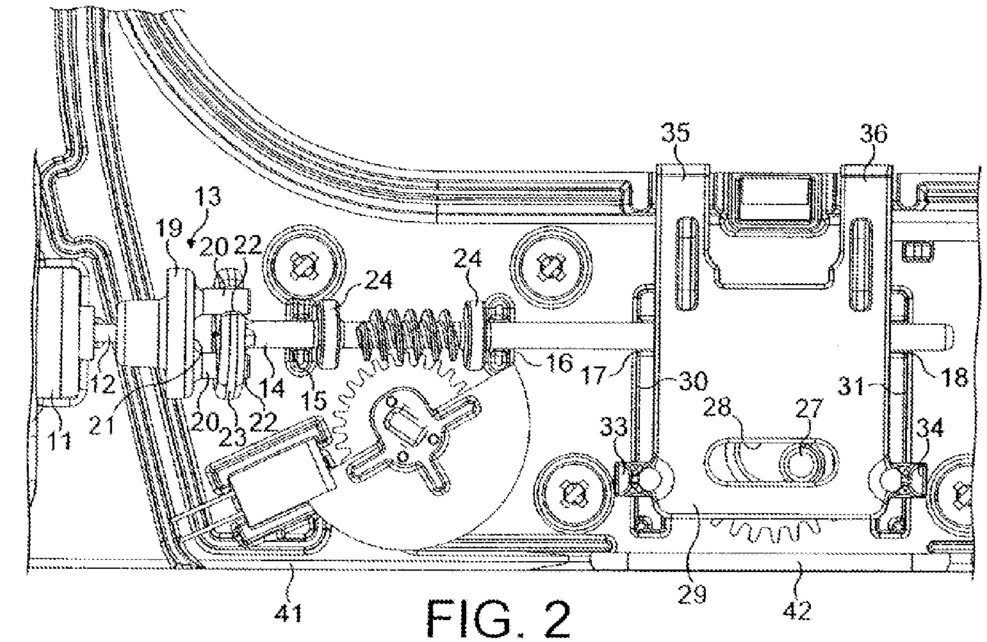
FIG. 2 is an enlarged cross-sectional view illustrating the latch mechanism.

In the illustrated arrangement, latch mechanism 6 comprises an electric motor 11, the spindle 12 of which is adapted, via a coupling 13, to rotate a drive rod 14 (best shown in the enlarged views of FIGS. 2 and 3) mounted for rotation in bearings 15, 16, 17 and 18. Coupling 13 comprises a first disc 19 mounted on spindle 12 and having a plurality (here two) of projections 20 extending parallel to the spindle axis from forward face 21 of disc 19. Projections 20 are received in through openings 22 in a second disc 23 mounted on one end of drive rod 14. Projections 20 are enabled to slide in the axial direction in through openings 22 so as to accommodate any tolerance or movement between drive rod 14 and spindle 12 in the axial direction of the drive rod. The bearings 15, 16, 17 and 18 may be formed of first bearing parts integrally moulded with housing main portion 5 and second bearing parts that cooperate with the first and are integrally moulded in the cover (not shown) for main housing portion 5. Drive rod 14 may be a simply pushed into the first bearing parts of bearings 15, 16, 17 and 18 before the cover is fitted to complete the bearings. It is prevented from moving by any substantial distance in its axial direction by lands 24. Drive rod 14 mounts a worm 25 which is adapted to drive a cog wheel 26. Cog wheel 26 mounts an eccentric pin 27 which is adapted to slide within a slot 28 formed in a latch plate 29. Latch plate 29 is constrained to slide vertically within slots 30, 31 formed in face 32 of main housing portion 5.

Figure 3:
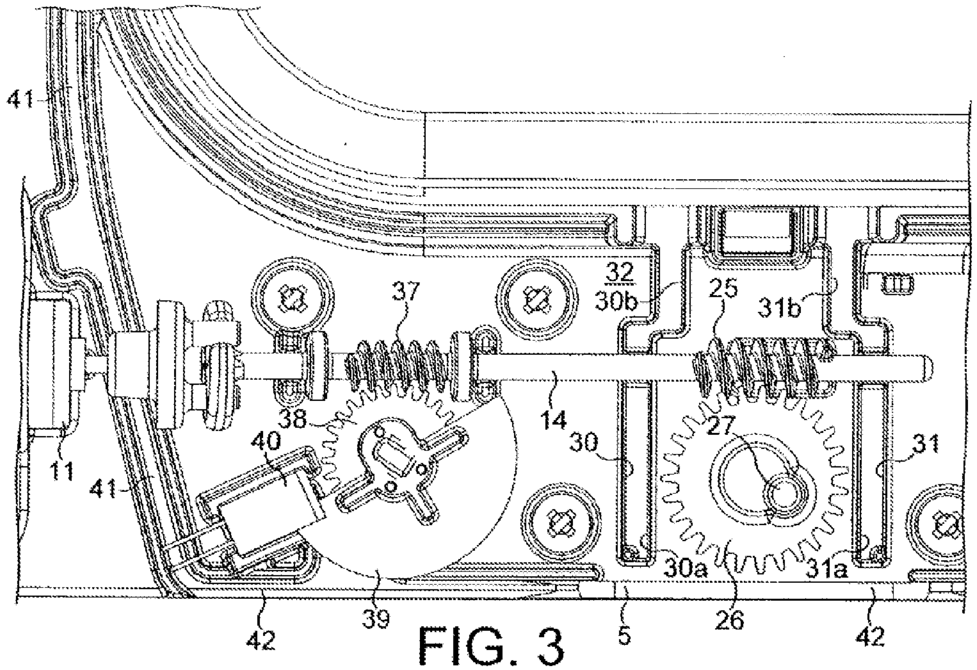
FIG. 3 is a cross-sectional view similar to FIG. 2 with the latch plate omitted to show otherwise hidden parts.

As can be seen from FIG. 3, from which latch plate 29 has been omitted, slots 30, 31 each have a cranked configuration so as to define lower portions 30*a*, 31*a* which are separated from each other by a greater distance than upper portions 30*b* and 31*b* of the slots. Latch plate 29 has projections 33, 34 that extend sideways from a lower portion of the latch plate 29 and mount pins (not illustrated) adapted to be guided in lower portions 30*a* and 31*a* of the slots. The face of latch plate 29 opposite that illustrated in FIG. 2 carries two further guide pins (not illustrated) which are guided in the upper portions 30*b* and 31*b* of the slots. Thus, as drive rod 14 turns and cog wheel 26 rotates driven by worm 25, eccentric pin 27 is allowed to slide in slot 28, and this causes the latch plate 29 to slide vertically upwards or vertically downwards, depending upon the direction of rotation of the drive rod, guided in slots 30 and 31. Latch plate 29 has an upper end bifurcated to form two separate latch members 35, 36 adapted to engage in blind openings formed in the lower edge of flap 1.

Drive rod 14 mounts a second worm 37 adapted to drive a cog wheel 38 mounting a semi-circular sector plate 39 formed of a non-transparent material and adapted to occlude a light sensor 40 to provide an indication to processor 8 as to whether latch plate 29 is in its raised position to provide latching engagement with flap 1, or not.

The above described latch mechanism is believed novel in itself and may be employed regardless of whether or not the system cooperates with passive tags worn by animals, as explained below. While this latch mechanism is preferred in the embodiment of pet door unit described in detail below, it will be understood that other forms of latch mechanism may be substituted in alternative embodiments.

A variety of different systems are currently employed to detect an animal at or close to a pet door for controlling its operation. Many of the novel features described herein and embodied in the specific embodiment of pet door unit illustrated in the accompanying drawings will find utility in pet door units operating on different systems of detection, including infra-red detectors.

However, in the preferred arrangement, one or more pets associated with the household in which the illustrated pet door has been mounted in a door to allow entry and egress for those pets are each provided with a passive tag comprising a binary coded microchip and an oscillatory circuit including a pick-up coil. Different tags are given different binary codes. The pet door is provided with a coil of wire (omitted for clarity) adapted to transmit an interrogation signal at a high frequency to interrogate the binary code in exactly the same fashion as subdermal pet identification tags are "read" through the skin by placing an interrogator coil on the skin surface.

It is explained below how it is possible to enhance coupling between the coils to get useful results. The resultant modulation of the waves of the interrogation signal by different amounts for "0"s and for "1"s in the binary code, as energy is transferred to the pick-up coil of the tag via an inductive link between the coils, enables the processor 8 to determine the binary code of the tag from the interrogation signal. Thus, processor 8 may be pre-programmed to enable it to determine whether a tag so detected identifies a pet permitted to enter or permitted to exit. That recognition of permission may then cause the latch mechanism to be driven to release the latch and allow entry or egress as the case may be. The processor 8 and latch mechanism 6 thus act as a latch disabling means when a permitted tag is detected. Because a plurality of pets may be given tags with different binary codes, this enables the system to control entry and exit of a plurality of different pets within the same household whose windows of opportunity for entry and exit may be set to be different from each other.

This feature is believed novel in itself in pet doors and may be employed independently of other features disclosed herein.

The present embodiment of pet door unit enables the entry and exit of a number of different pets to be controlled with entry and exit windows that may be different from each other.

For the system to work efficiently, a reliable inductive link must be created between the pet door coil and the coil in the tag worn by the pet. Since the tag will suitably be mounted on the animal's collar, it is likely to be positioned close to the pet door when the animal is seeking entry or egress, and beneath the animal's neck. A channel 41 is defined in the face of main portion 5 of the housing to accommodate the pet door coil (not shown). The coil must obviously run around the perimeter of flap 1. It will be noted, however, that, beneath the flap, channel 41 is diverted from the periphery of the flap 1 to as low as possible a position 42 adjacent the rim of main portion 5 of housing 3. By this means, the maximum possibility for inductive coupling between the pet door coil and the coil of an animal's tag coil hanging beneath its collar is created, and thus the maximum opportunity for a permitted tag to be detected. The coil preferably operates at a frequency of 125 kHz.

Latches operable by tags worn by pets have been provided in pet doors previously with coils running around the periphery of the flap proper. However, as far as presently aware, it has never previously been suggested to divert the pet door coil from the periphery of the flap to the lowest possible position within the pet door unit beneath the flap so as to achieve maximum coupling with a tag hanging from the collar of a pet approaching the pet door. The better the inductive coupling, the more reliable is the system, whatever form of tag is employed, and the need for repeated interrogations before entry or egress is allowed can be reduced. The present novel coil geometry is applicable to both the present binary coded microchip tags and to other more conventional tags adapted to operate a pet door latch via an inductive link.

If an interrogation signal were provided continuously, the batteries 7 would very soon run down. Indeed, a structure of the kind described would simply not be workable without a main electricity supply in place of batteries. However, a system has been devised which allows for conservation of battery power.

As explained below, the presently described embodiment causes the processor 8 to generate an interrogation signal when a pet is present at the pet door. This is possible because animals, especially cats, habitually push the door/flap before trying to make passage past it. It has been found that the fact that the door/flap has been pushed, and from which side, can readily be determined by the provision of appropriate reed switches. Preferably, as shown, two reed switches 43, 44 are mounted adjacent a corner of the door/flap, and best shown in the greatly enlarged view of FIG. 4.

Figure 5:
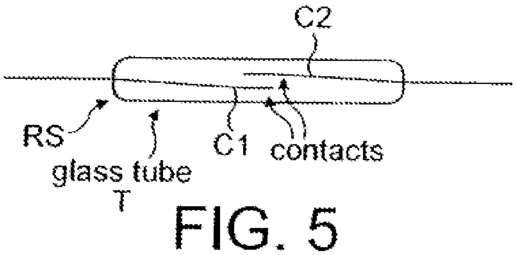
FIG. 5 is a schematic view of a reed switch.

A reed switch RS (see FIG. 5) commonly comprises two magnetic contacts C1 and C2 within a glass or ceramic tube T filled with a protective gas. When a magnet comes close to the reed switch RS by displacement or by rotation, so that one out of the two contacts C1 and C2 becomes magnetized to be more "North" than the other, the two contacts will be attracted to each other to complete an electric circuit through the switch. Otherwise, the contacts C1 and C2 separate and the circuit opens.

Figure 4:
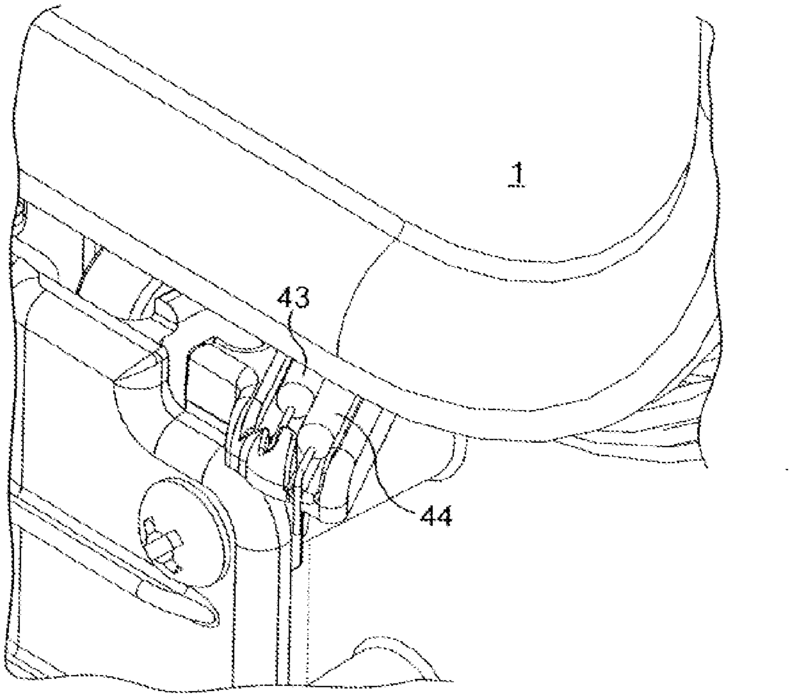
FIG. 4 is a much enlarged partial perspective view of a corner of part of the unit adjacent one corner of the pet door, with parts omitted for clarity.

As can be seen, in particular from FIG. 4, reed switches 43 and 44 are mounted beneath flap 1 adjacent one corner thereof. Although the two reed switches are mounted essentially in the same horizontal plane they are mounted both skew rather than normal to the vertical plane of the flap and staggered relative to each other so that one reed switch 43 extends beyond the flap 1 when it hangs in its vertical position in the direction of the exterior (the tunnel 4 side of the flap) while the other reed switch 44 is displaced slightly in the other direction, namely into the dwelling side of the cat flap in use.

The edge of flap 1 adjacent the two reed switches 43 and 44 carries a magnet adapted to operate those reed switches.

The magnet is preferably aligned with the edge of the flap. When the flap is in its medial central position, both reed switches are off-set from the medial position in opposite directions. This means that for each reed switch, one of its reeds will be more exposed to the magnet than the other, causing attraction between its reeds, so that the switch is closed. Thus, when the flap is exactly in its median central position, both switches will be closed. However, when, for example, a cat approaches the cat flap from the exterior (tunnel 4) side, its habit will generally be to push with its paw against the flap. This causes the flap to move slightly (the latch is designed to allow small movements even when latched). This causes a displacement of the magnet in the edge of the flap so that it now magnetises both reeds of switch 44 equally. When the door is unlatched, and moves further, the magnet first closes reed switch 44 as the effect on the two reeds of that switch again become unbalanced. As it moves even further, it will cease to have any substantial differential effect on the reeds of either switch, so that both will be open.

Thus noting the pattern of opening or closing of the two reed switches of the described arrangement, enables the system to tell not only from which side a cat is seeking to open the flap when it is latched, but also whether the flap then opens after being unlatched.

Thus, the arrangement of the two reed switches 43 and 44 enables the system to know whether the flap is at rest, whether a cat is attempting to make entry, whether a cat is attempting to make egress and whether the flap is open. The logical information is set out in Table 1 below.

TABLE 1

| | Reed 44 | Reed 43 | Information |
|---|---|---|---|
| Flap is at rest | Closed | Closed | Flap at rest, do nothing saving power |
| Flap moved from inside | Closed | Open short time | Flap moved from inside. If cats are allowed out then start looking for tag. When tag found, if that tag is allowed out, then open lock |
| Flap moved from outside | Open short time | Closed | Flap moved from outside. If cats are allowed in then start looking for tag. When tag found, if that tag is allowed in, then open lock |
| Flap open | Open | Open | Do not lock the flap until flap closed |
| Flap closed | Closed | Closed | When both reeds open, lock can be shut, as flap is in the centre. The flap is locked as soon as is possible to stop other cats getting in or out |

Figure 6:
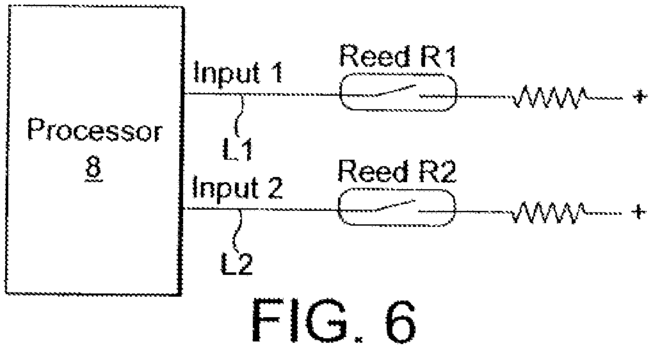
FIGS. 6 and 7 are schematic circuit diagrams of reed switch circuits.
Figure 7:
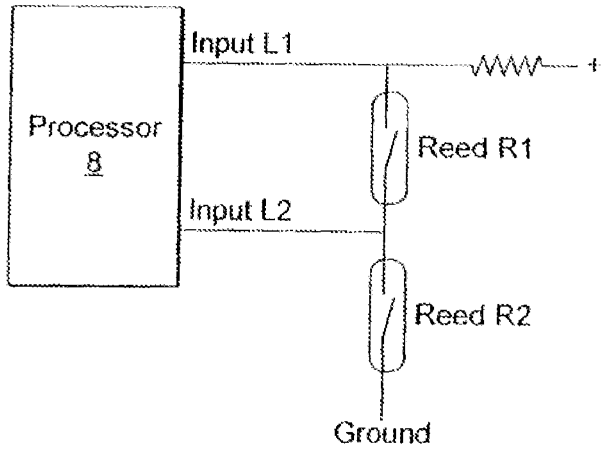

The two reed switches 43 and 44 may be linked to processor 8 by a simple circuit such as that shown in FIG. 6 in which an input on line L1 indicates that reed R1 is closed and an input on line L2 indicates that reed R2 is closed. However, it is preferred to employ the alternative circuit of FIG. 7 which employs only a single power connection and uses essentially half the power that would be required for the circuit of FIG. 6, and involves a modified logic.

The alternative logic involved with this circuit is explained in Table 2.

TABLE 2

| | Input L1 | Input L2 |
|---|---|---|
| Flap is at rest | Ground voltage | Input not used |
| Flap moved | Positive voltage - start looking at Input L2 | If ground voltage, reed R2 open. If positive voltage, reed R1 open |
| Flap open | Positive voltage | Not positive or ground |
| Flap closed | Ground voltage | Input not used |

Other arrangements are also possible. Thus if the magnet is vertically aligned to present a pole to the switches, then when the flap is centrally located in its median vertical plane, the magnet will cause both reed switches 43 and 44 to be closed. Pushing the flap from the exterior (tunnel 4) side may cause the flap to move to displace the magnet in the edge of the flap sufficient to disengage reed switch 43 while leaving reed switch 44 engaged. Conversely, when a cat approaches the flap from the dwelling side with, pushing the flap slightly may cause just sufficient movement of the magnet in the edge of the flap to disengage reed switch 44 while leaving reed switch 43 engaged.

In this construction, further movement on unlatching the door will result in movement of the magnet out of reach of both reed switches so that both will be open.

The use of the two reed switches, as discussed above allows the system to know whether an animal is seeking to enter or to leave the dwelling, which information can be used to control a latch, and also to know whether the door subsequently opens after being unlatched. Thus, regardless of whether any tags are fitted to the household pets, the two reed switch arrangement may be used to trigger unlatching while keeping the latch otherwise closed. A four-way control of the latch becomes possible, namely: open for entry and closed for egress; closed for entry and open for egress; closed both ways; and open both ways.

However, it is preferred to use the knowledge of attempted use, and from which side, in a more sophisticated control system employing tags. This is explained with reference to the logic diagrams of FIGS. 9 and 10.

The system employs a programmable processor, preferably a PIC16F627a or PIC16F870 processor, the processor being operated from a microchip of the read/write analogue front end type for 125 kHz RFID base station. A suitable such microchip is sold by E M Micro Electronic under the designation EM4095.

The tags for permitted animals must first be calibrated to the processor. This is achieved by the following routine:

1. Press the "tag" button (for example button 49) for a set period (say 5 seconds).
2. The display flashes.
3. The tag is moved close to the flap.
4. That an interrogation signal from the processor and the pet door coil has detected the presence of the tag is indicated by the flashing slowing down.
5. The binary code of the particular tag is then stored in the processor by pressing a "set" button (such as button 50).
6. Steps 1 to 5 are repeated for up to 7 further tags.

For each said tag, periods for allowed entry and for allowed egress must be programmed into the processor following a menu set in the processor. The individual tags, after having their digital code stored in the processor, must then be fitted to the collars of individual pets such as cats. Thereafter, the system operates essentially as shown in the logic flow diagram of FIG. 9.

The default setting 51, or "waiting stage", runs the system in power-saving mode, consuming very little power from the batteries. In that power saving mode, the system checks periodically at step 52 whether either of the reed switches 43 or 44 has operated (is open). If the switch has operated, the system checks at 53 whether the cat in question is trying to enter or leave the dwelling, this being determined, as explained above, by switches 43 and 44. If a cat is trying to come in, then, at step 54, a check is made whether, at the particular time, any of the permitted cats is allowed to come in. If the answer is "no", then the system is returned to its waiting power-saving mode 51. If the answer is "yes", then the system looks for a tag at step 55.

As explained above, looking for a tag involves sending out an interrogation signal via the pet door coil. At step 56, the system determines whether any permitted tag is detected. If no permitted tag is detected, then, at step 57, a check is made whether a predetermined number of seconds have elapsed since the system started looking for a tag. If it has not, then the system recycles to look for a tag again. If the predetermined period has elapsed and no permitted tag has been detected, then the system assumes that it is a stray cat that is trying to get in, and the system remains locked and returns to its power-saving mode 51. If a tag is detected at step 56, then a check is made at step 58 whether the tag so detected identifies a cat that is allowed, at the particular time, to go in. If that detected tag does not have permitted entry at the time in question, the system returns to its waiting power-saving mode 51. However, if the detected tag is associated with a cat that does have permission to enter at the time in question, the flap is unlocked at step 59 by energizing motor 11 to rotate drive rod 14, and so cause latch plate 29 to move downwardly to release the flap.

A check is made at step 60 whether the flap has been opened, this check being made by reed switches 43, 44, as explained above, subsequent to being unlocked. If the flap has not been opened, then a check is made at step 61 to see whether a predetermined number Y of seconds has elapsed since the flap was unlocked. If it has not, then, after a short interval, the system checks again at step 60 whether the flap has been opened. If at check 61 the period of Y seconds has elapsed since the flap was unlocked, then the system moves to step 62. Also at step 60, if the flap has been opened, then the system passes to step 62. In this step 62, the system checks whether the flap is in its centre position. This is also determined by the two reed switches 43 and 44. If both are closed then the flap is in its medial central vertical position. If the flap is not in its centre position then, after a brief delay, the system checks again at step 62 whether the flap is in its centre position. If the flap has been opened and the flap has returned to its medial central position as detected at step 62, it is safe to lock the flap again in step 64 and return the system to its waiting mode 51.

Essentially identical steps will be followed (Right-hand side of FIG. 9) if it was determined at step 53 that the cat was trying to get out. Processor 8 has a clock and may thus record successful passage of the cat past the pet door ("Yes" at step 60) and the direction (Step 53) of passage.

With the system described above and adopting the logic shown in FIG. 9, problems may still occur in conditions where the wind is sufficient to repeatedly move the flap, or where a cat is particularly diffident in using the flap and repeatedly pushes the flap before actually making passage therepast. In either of these conditions, this will result in high power usage. In the standard system of FIG. 9, if (say) the flap is pushed every 10 seconds by a cat or moved every 10 seconds by the wind, the system would go flat using standard size A batteries in around 4 hours. Of course it is unlikely that a cat that is locked out would try repeatedly to get in for 4 hours in any one go but even trying for 3 minutes every day, this would have the effect of reducing a standard 9 months battery life down to just 2 to 3 months. The protocol illustrated in the logic diagram of FIG. 10 overcomes these problems and in practical examples, has been shown to save up to 94% of the battery life. Use of the protocol of FIG. 10, even with a cat that repeatedly pushes the flap for 3 minutes every day, will have the effect of reducing battery life from the standard 9 month period by only as little as 10 days.

Figure 9:
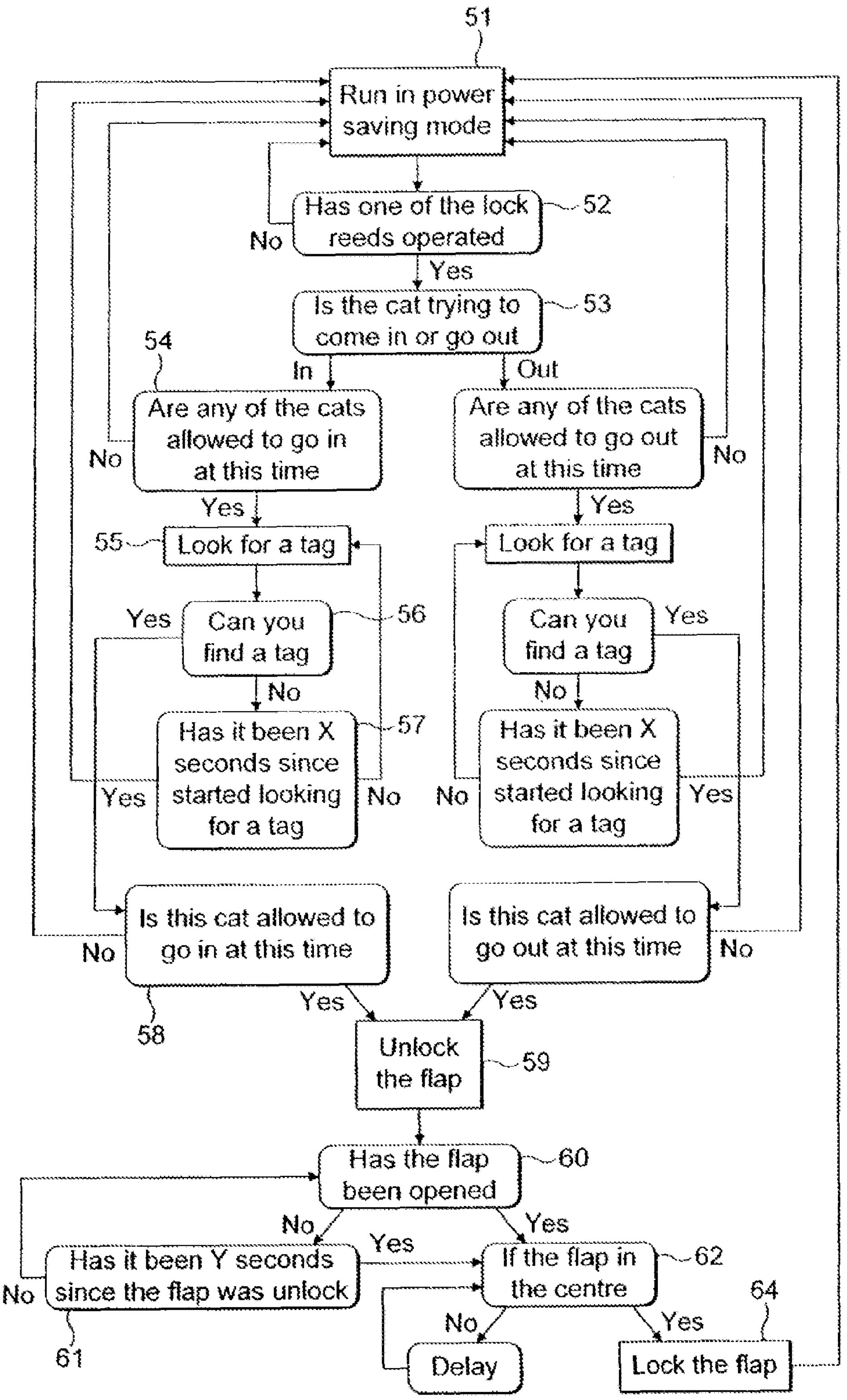
FIGS. 9 and 10 are logic diagrams of use in explaining operation of preferred embodiments.
Figure 10:
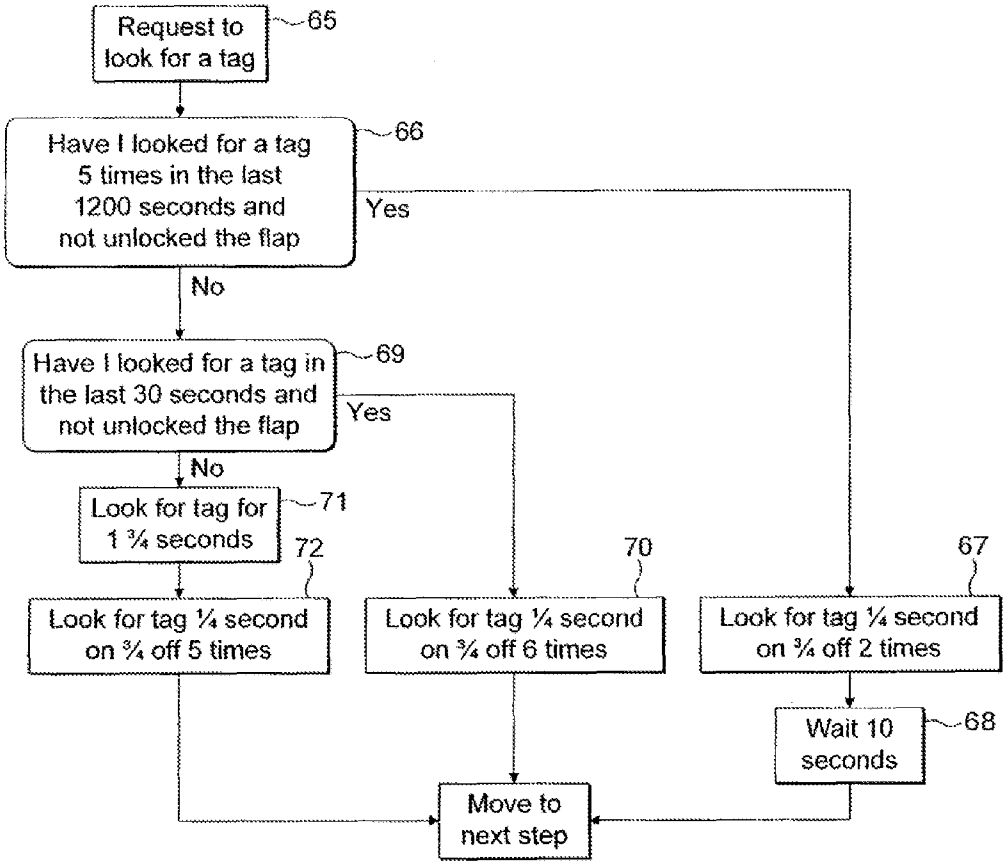

As will be appreciated, the protocol of FIG. 10 applies at step 55 of the FIG. 9 logic. The system is requested at 65 to look for a tag as a result of the answer "yes" being achieved at step 54. At step 66, the system checks whether it has looked for a tag 5 times in the last 20 minutes and not unlocked the flap. If the answer is "yes", then the system moves straight to step 67 and looks for a tag for up to ¼ second on and ¼ second off up to two times. It then waits for 10 seconds at step 68 if it did not find a tag, and then moves on to step 51. However, if the answer at step 66 is "no", so that the system has not looked for a tag 5 times within the past 20 minutes without unlocking the flap, then the system moves to step 69, and asks whether it has looked for a tag in the past 30 seconds without unlocking the flap. If the answer to this is "yes", then the system moves to step 70, and looks for a tag for up to ¼ second on and ¾ second off for up to 6 times before moving to step 51. However, if the answer at step 69 is "no"—the system has not looked for a tag in the last 30 seconds without unlocking the flap—then the system moves to step 71, and looks for a tag for up to 1¾ seconds, and then to step 72 if it did not find a tag, and looks for a tag for up to ¼ second on and 1¾ second off for up to 5 times before moving to step 51 of the FIG. 9 logic.

With this protocol, the system will still be able to find a tag quickly except in the circumstance where a succession of false positives have recently occurred, and even in this situation the maximum time that a cat that does have permission to come in may have to wait will be 10 seconds. Thus, a balance is struck between efficiency and power saving.

Figure 8:
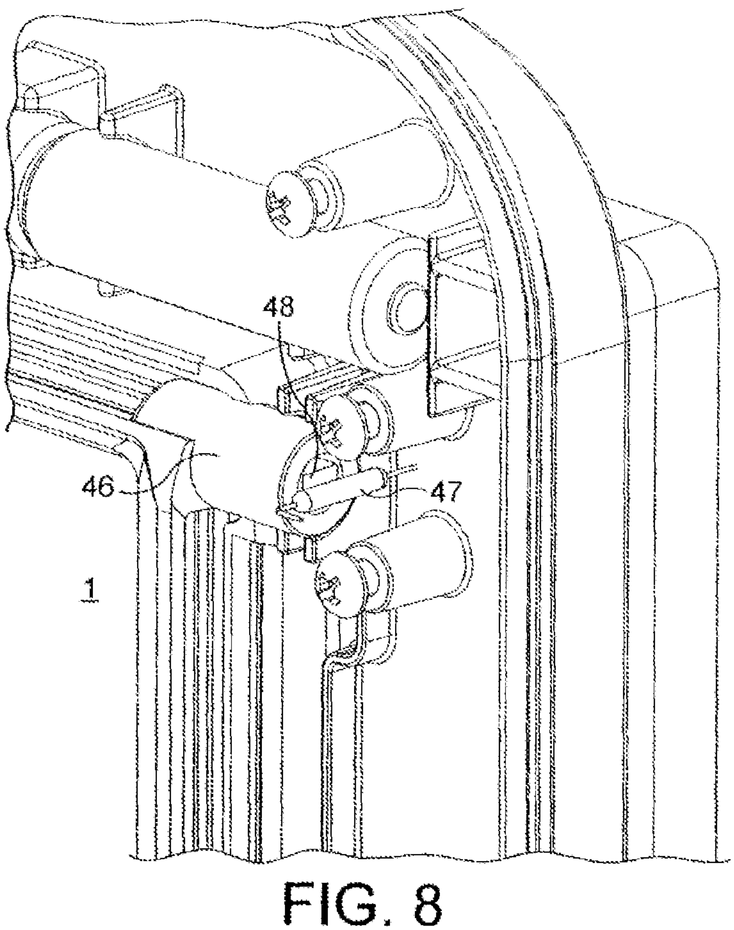
FIG. 8 is a much enlarged partial perspective view of the unit adjacent one end of the pet door pivot.

Even after the latch has opened, a cat may simply push the flap but not make an entry past it. This may show up as an indication at stage 60 that the flap has opened. By use of a further reed switch in our preferred embodiment, as now explained with reference to FIGS. 1 and 8, it can be told for certain whether a cat has passed through the pet door. In this arrangement, the door consists of a flap 1 mounted for rotation about a horizontally extending axis defined by respective pivots 45 and 46. A third reed switch 47 is fixedly mounted in confronting relation with a magnet 48 that is mounted on one pivot 46 so as to be rotatable with the flap. Magnet 48 is aligned so that the North-South alignment of its poles is at right angles to the longitudinal direction of the reed switch 47 when the flap 1 hangs vertically in which condition the switch is closed providing an input to processor 8. Rotation of the flap through an angle of (say) 45° or more, corresponding to passage of an animal through the pet door past the flap, will rotate the magnet by the same substantial angle and cause the switch to open. However, movement of the flap only by a small angle is not sufficient to open the reed switch. Thus, the system is enabled to know whether a pet has actually passed through the flap rather than merely pushed the flap from one side, and then retreated. Since the system already knows through reed switches 43 and 44 from which side the animal was coming, this means that the system knows at any time whether a particular pet has passed through the pet door and so is either inside the dwelling or outside.

As the processor includes a clock, it may be programmed to store the time of last passage through the pet door for any tag, and in which direction. A pet owner can thus tell whether a particular pet has been out for a prolonged period and may therefore be missing.

In a household that has only a single pet, this third switch, coupled with the double reed switch to tell from which direction the animal was approaching the door, provides information whether the animal is in or out, regardless of whether it is wearing a tag or not; and this may be coupled with a time stamp for each (or the last) opening of the door to provide passage.

Other arrangements for telling whether the door has opened sufficiently for an animal to pass therepast are also feasible. These may include infra-red detectors on either side of the door, or a system in which switches are operated by the door at predetermined angles of opening indicative of an animal passing the door.

The illustrated embodiment has a flap hung from a horizontal axis. The invention in all its aspects is equally applicable to doors mounted to swing on a vertical axis. In such an arrangement, the reed switches 43, 44 may be located adjacent the edge of the door away from its axis, or along either the upper or lower edges of the door at a position away from that axis. The same principle may be applied to arrangements in which the flap is fixed at its top edge, but is formed of flexible material that is displaceable by an animal passing the pet door and then returns to its original medial central position. In this case, the reed switches 43, 44 may be located, as in the illustrated embodiment adjacent the lower edge of the flap.

The detailed description of operation of the illustrated embodiment refers to cats. The systems disclosed herein will work equally well for a pet door designed to be used by dogs. Unlike cats, dogs tend to be more positive in approaching a pet door. Whereas a cat will usually push at the door with its paw with a noticeable delay before it actually passes through the door, dogs tend to push straight into the door with an expectation that it will open for them. Nevertheless, the moment a dog pushes into the door, this will cause one of the reed switches to open. This brings the system out of its power-saving mode. The logic steps may be adjusted to be performed at a rapid rate so that a permitted dog hardly notices a delay before the latch is released and the door yields to their push.

We claim:

1. An apparatus for allowing entry to and egress from a dwelling of an animal, the apparatus comprising:

a housing suitable for mounting to a door, window or wall of the dwelling;

a pet door mounted to said housing;

a latch cooperative with said pet door, said latch movable between an engaged position and disengaged position, said pet door suitable for allowing passage of the animal therethrough when said latch is in said disengaged position, said pet door suitable for blocking passage of the animal therethrough when said latch is in said engaged position;

an animal detector interconnected to said housing, said animal detector suitable for detecting a presence of an animal seeking passage through said pet door;

a controller cooperative with said animal detector, said controller suitable for selecting a passage condition, said passage condition being one of entry but not egress, of egress but not entry, of both entry and egress and of neither entry nor egress; and a latch actuator cooperative with said latch and coupled to said controller, said latch actuator suitable for causing said latch to move between said engaged position and said disengaged position depending on said passage condition, wherein said animal detector comprises a pair of reed switches each having a closed state and an open state and operable by a magnet carried by said pet door, said pet door having a central median position, said pet door when engaged by said latch being movable through a first minor distance from the central median position in a direction into the dwelling by the animal pushing said pet door from outside, an arrangement of said pair of reed switches and said magnet being such that the open state or closed state of a first of said pair of reed switches is changed by movement of said pet door through the first minor distance, said pet door when engaged by said latch being movable through a second minor distance from the central median position in a direction out of the dwelling by the animal pushing said pet door from inside, the arrangement of said pair of reed switches and said magnet being such that the open state or closed state of a second of said pair of reed switches is changed by movement of said pet door through the second minor distance, wherein said pair of reed switches are connected in series across a source of electric potential by a first reed of a first one of said pair of reed switches and being connected to a first reed of a second one of said pair of reed switches in a circuit providing first and second inputs on first and second lines, said first line being connected to a second reed of said first one of said pair of reed switches, said second line being connected both to said first reed of said first one of said pair of reed switches and to said first reed of said second one of said pair of reed switches, a detection of the potential of the second reed of the second one of said pair of reed switches on said first line indicating that both of said pair of reed switches are closed and said pet door is in the median central position, a detection of the potential of the second reed of the first one of said pair of reed switches on the first line and the potential of one of the second reeds of the pair of reed switches on the second line indicating that said pet door has moved, the direction being determined by which of the potentials is present on said second line, a detection of the potential of the second reed of the first one of said pair of two reed switches on the first line and a potential other than those of the second reeds on the second line indicating that said pet door is open.

2. An apparatus for allowing entry to and egress from a dwelling of an animal, the apparatus comprising:

a housing suitable for mounting to a door, window or wall of the dwelling;

a pet door mounted to said housing;

a latch cooperative with said pet door, said latch movable between an engaged position and disengaged position, said pet door suitable for allowing passage of the animal therethrough when said latch is in said disengaged position, said pet door suitable for blocking passage of the animal therethrough when said latch is in said engaged position;

a clock;

a controller coupled to said clock, said controller suitable for selecting a permitted entry period in which the animal is allowed entry into the dwelling and for selecting a permitted exit period in which the animal is permitted egress from the dwelling;

an animal detector interconnected to said housing, said animal detector suitable for detecting whether an animal appears to seek entry or egress through said pet door; and a latch actuator cooperative with said latch and coupled to said controller, said latch actuator suitable for causing said latch to move to said disengaged position when said animal detector detects the animal seeking entry during the permitted entry period and when said animal detector detects the animal seeking egress during the permitted exit period, wherein said animal detector comprises two reed switches each having a closed state and an open state and operable by a magnet carried by said pet door, said pet door having a central median position, said pet door being movable through a first minor distance from the central median position in a direction into the dwelling by the animal pushing said pet door when said latch is in the engaged position, an arrangement of said two reed switches and said magnet being such that an open or closed state of a first of the two reed switches is changed by a movement of said pet door through the first minor distance, said pet door when said latch is in said engaged position being movable through a second minor distance from the central median position in a direction out of the dwelling by an animal pushing said pet door, the arrangement of said two reed switches and said magnet being such that the open or closed state of the second of said two reed switches is changed by movement of said pet door through second minor distance, wherein said two reed switches are connected in series across a source of electric potential by a first reed of a first one of said two reed switches being connected to a first reed of a second one of said two reed switches in a circuit providing first and second inputs on first and second lines, the first line being connected to a second reed of said first one of said two reed switches, and the second line being connected both to the first reed of said first one of the two reed switches and to the first reed of the second one of said two reed switches, a detection of a potential of the second reed of the second one of said two reed switches on said first line indicating that both of said two reed switches are closed and said pet door is in the median central position, a detection of a potential of the second reed of the first one of said two reed switches on said first line and a potential of one of the second reeds of said two reed switches on said second line indicating that the pet door has moved, the direction being determined by which of the potentials is present on said second line, a detection of the potential of the second reed of the first one of said two reed switches on said first line and a potential other than those of the two second reeds on said second line indicating that said pet door is open.

3. An apparatus for allowing entry to and egress from a dwelling of an animal, the apparatus comprising:

- a housing suitable for mounting to a door, window or wall of the dwelling;
- a pet door mounted to said housing;
- a latch cooperative with said pet door, said latch movable between an engaged position and disengaged position, said pet door suitable for allowing passage of the animal therethrough when said latch is in said disengaged position, said pet door suitable for blocking passage of the animal therethrough when said latch is in said engaged position;
- a clock;
- a tag suitable for application to the animal;
- a controller coupled to the clock, said controller suitable for selecting a permitted entry period in which the animal with said tag is allowed entry to the dwelling and for selecting a permitted exit period in which the animal with said tag is permitted egress from the dwelling;
- an animal detector coupled to said controlling means and suitable for detecting whether an animal appears to be seeking entry or egress from the dwelling;
- a tag detector suitable for detecting a presence of said tag adjacent said pet door; and
- a latch actuator cooperative with said latch and coupled to said controller so as to selectively move said latch to said disengaged position so as to allow entry by the animal when said tag detector detects said tag and when said animal detector detects the animal seeking entry during said permitted entry period, said latch actuator selectively moving said latch to said disengaged position when both said tag detector detects said tag and when said animal detector detects the animal seeking egress during said permitted exit period, wherein said animal detector comprises two reed switches each having a closed state and an open state and operable by a magnet carried by said pet door, said pet door having a central median position, said pet door when said latch is in said engaged position being movable through a first minor distance from the central median position in a direction into the dwelling by the animal pushing the pet door from outside, said two reed switches and said magnet being such that an open or closed state of a first of said two reed switches is changed by a movement of said pet door through the first minor distance, said pet door when said latch is in said engaged position being movable through a second minor distance from the central median position in a direction out of the dwelling by the animal pushing the pet door from inside, said two reed switches and said magnet being such that an open or closed state of the second of said two said reed switches is changed by movement of said pet door through the second minor distance, wherein said two reed switches are connected in series across a source of electric potential by a first reed of a first one of said two reed switches being connected to a first reed of the second one of said two reed switches in a circuit providing first and second inputs on first and second lines, said first line being connected to a second reed of said first one of the two reed switches, said second line being connected both to the first reed of said first one of the two reed switches and to the first reed of the second one of said two reed switches, a detection of the potential of the second reed of the second one of said two reed switches on the first line indicating that both reed switches are closed and said pet door is in its median central position, a detection of the potential of the second reed of the first one of the two reed switches on the first line and the potential of one of the second reeds of the two reed switches on the second line indicating that said pet door has moved, the direction being determined by which of the two potentials is present on the second line, a detection of the potential of the second reed of the first one of said two reed switches on the first line and a potential other than those of said two second reeds on the second line indicating that said pet door is open.

4. An apparatus for allowing entry to and egress from a dwelling of an animal, the apparatus comprising:

- a housing suitable for mounting to a door, window or wall of the dwelling;
- a pet door mounted to said housing;
- a latch cooperative with said pet door, said latch movable between an engaged position and disengaged position, said pet door suitable for allowing passage of the animal therethrough when said latch is in said disengaged position, said pet door suitable for blocking passage of the animal therethrough when said latch is in said engaged position;
- a tag suitable for application to the animal;
- a tag detector for detecting a presence of said tag adjacent said pet door;
- a latch actuator cooperative with said latch, said latch actuator suitable for moving said latch to said disengaged position so as to permit passage of the animal with said tag through said pet door, said latch actuator maintaining said latch in said disengaged position for a select period of permitted passage, said pet door having a power saving mode and an active mode; and an animal detector separate from said tag detector, said animal detector suitable for detecting when the animal appears to be seeking passage through said pet door, said animal detector cooperatively connected to said pet door so as to initiate said active mode when the animal is detected, wherein said animal detector comprises a reed switch, the reed switch having a closed state and an open state and being operable by a magnet carried by said pet door, said pet door having a central median position, said pet door when said latch is in said engaged position being movable through a first minor distance from the central median position in a direction into the dwelling by the animal pushing the pet door from outside the reed switch and said magnet being such that the open or closed state of the reed switch is changed by the movement of said pet door through the first minor distance, said pet door when said latch is in said engaged position being movable through a second minor distance from the central median position in a direction out of the dwelling by the animal pushing the pet door from inside, the reed switch and said magnet being such that the open or closed state of the reed switch is changed by the movement of said pet door through the first minor distance, wherein said reed switch comprises two reed switches, wherein said two reed switches are connected in series across a source of electric potential by a first reed of a first one of said two reed switches being connected to a first reed of the second one of said two reed switches in a circuit providing first and second inputs on first and second lines, the first line being connected to a second reed of said first one of said two reed switches, the second line being connected both to the first reed of said first one of said two reed switches and to the first reed of the second one of said two reed switches, a detection of the potential of the second reed of the second one of said two reed switches on the first line indicating that both reed switches are closed and said pet door is in the median central position, a detection of the potential of the second reed of the first one of said two reed switches on the first line and the potential of one of the second reeds of said two reed switches on the second line indicating that the pet door has moved, the direction being determined by which of the two potentials is present on the second line, and the detection of the potential of the second reed of the first one of said two reed switches on the first line and a potential other than those of the two second reeds on the second line indicating that the pet door is open.

5. The apparatus of claim 4, wherein the period for permitted passage comprises a period of permitted entry for said tag, and a period for permitted egress for said tag.

* * * * *